US011366676B2

(12) United States Patent
Stephenson et al.

(10) Patent No.: US 11,366,676 B2
(45) Date of Patent: Jun. 21, 2022

(54) EMBEDDED USER ASSISTANCE FOR SOFTWARE APPLICATIONS

(75) Inventors: Jeffrey Stephenson, San Carlos, CA (US); Maria Elisabeth Kaval, Menlo Park, CA (US); Ritchard Shadian, San Mateo, CA (US); Matthew Clifton Cooper, Centennial, CO (US); Gabrielle Crawford, San Mateo, CA (US); Scott Michael O'Bryan, Golden, CO (US); Harry William Baggett, III, Pleasanton, CA (US); Blake Sullivan, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2589 days.

(21) Appl. No.: 12/013,499

(22) Filed: Jan. 14, 2008

(65) Prior Publication Data

US 2009/0183072 A1 Jul. 16, 2009

(51) Int. Cl.

*G06F 9/451* (2018.01)
*G06F 3/0481* (2022.01)
*G06F 3/04895* (2022.01)

(52) U.S. Cl.

CPC ............ *G06F 9/453* (2018.02); *G06F 3/0481* (2013.01); *G06F 3/04895* (2013.01)

(58) Field of Classification Search

CPC .. G06F 3/0481; G06F 3/04895; G06F 9/4446; G06F 9/453
USPC .................................................. 715/705–715
See application file for complete search history.

(56) References Cited

U.S. PATENT DOCUMENTS

| | | | | |
|---|---|---|---|---|
| 5,581,684 | A * | 12/1996 | Dudzik et al. | 715/708 |
| 6,307,544 | B1 * | 10/2001 | Harding | 715/709 |
| 6,573,906 | B1 * | 6/2003 | Harding | G06F 9/453 715/705 |
| 7,237,192 | B1 | 6/2007 | Stephenson et al. | |
| 7,689,916 | B1 * | 3/2010 | Goel et al. | 715/711 |
| 2004/0036715 | A1 * | 2/2004 | Warren | G06F 9/4446 715/713 |
| 2007/0185976 | A1 * | 8/2007 | Solis | 709/219 |

OTHER PUBLICATIONS

Deloach, S., "Designing Embedded Help", 1997, pp. 1-3, http://www.userfirst.net/embedded.htm.

Grayling, T., "Fear and Loathing of the Help Menu: A Usability Test of Online Help", 1998, p. 1, http://tc.eserver.org/10347.html, Journal of the Society for Technical Communication.

(Continued)

*Primary Examiner* — Cesar B Paula
*Assistant Examiner* — Sajeda Muhebbullah
(74) *Attorney, Agent, or Firm* — Potomac Law Group, PLLC

(57) ABSTRACT

A system for providing user assistance receives a request for user assistance from a component on a user interface. The component includes a help identifier, and the request is generated by a type of user selection, such as the clicking of an icon. The system determines a level of user assistance based on the type of selection and retrieves user assistance content based on the help identifier and the determined level of user assistance. In one embodiment, the user interface includes three levels of user assistance.

20 Claims, 3 Drawing Sheets

(56) References Cited

OTHER PUBLICATIONS

Deloach, S., Divide and Conquer: Providing Web-based User Assistance at the Point of Use, [date unknown] pp. 1-5, Writers UA.

Ellison, M., Embedded User Assistance—the Future for Software Help?, 2007, pp. 30-31, Interactions.

* cited by examiner

EMBEDDED USER ASSISTANCE FOR SOFTWARE APPLICATIONS

FIELD OF THE INVENTION

One embodiment is directed generally to computer software, and in particular to user assistance for software applications.

BACKGROUND INFORMATION

Software applications, including applications running on a stand-alone computer ("native applications") as well as web-based applications, typically provide user assistance or "help" via an external help system. With an external help system, a user requests help assistance usually by clicking a button or pressing a key, and a separate window is typically generated. In many applications, the window has a tri-pane layout that is capable of showing Hypertext Markup Language ("HTML") pages written by help authors as well as some navigation aids, such as a table of contents. Examples of external help systems with tri-pane windows can be found in the Internet Explorer browser from Microsoft Corp. (i.e., a help window generated in response to pressing the F1 key) and the Adobe Reader (i.e., a help window generated through interaction with the Help menu) from Adobe Systems, Inc.

To initiate an external help system, the application's user interface typically includes special purpose controls. For example, many applications have a Help menu that allows access to the external help system. In addition, parts of the application that are specific to a certain task, such as a dialog or panel in a native application, or a page in a web application, may have a button or link that launches the external help system while passing a specific "topic id" that identifies the topic in the external help system that is relevant to that part of the user interface. This is referred to as a "context-sensitive" help request.

External help systems have a few disadvantages. For one, users have to deliberately perform a certain action (e.g., using the Help menu, clicking on the Help button, pressing the F1 key, etc.) in order to see the help content for the task they are performing. However, usability studies have shown that some users are reluctant to perform that action—they would rather try to figure it out themselves rather than "ask" for help. In addition, because external help systems launch in a separate window, they naturally take focus away from the application.

Because of some of the above disadvantages, increasingly "embedded user assistance" is being used in place of or in conjunction with external help systems. Embedded user assistance attempts to integrate help content text directly in the application's user interface, rather than requiring the user to take some action. However, implementing embedded user assistance as part of the software application development process creates additional problems and challenges. For example, there is a need to display the information on the user interface so that it does not take up too much screen real estate. Further, there is a need for very close cooperation during the development process between the help documentation author and the software developer that is implementing the user interface. Further, most current help authoring tools are designed to create external help systems. There are very few tools or support available for embedding help topics into an application user interface.

SUMMARY OF THE INVENTION

One embodiment is a system for providing user assistance. The system receives a request for user assistance from a component on a user interface. The component includes a help identifier, and the request is generated by a type of user selection, such as the clicking of an icon. The system determines a level of user assistance based on the type of selection and retrieves user assistance content based on the help identifier and the determined level of user assistance. In one embodiment, the user interface includes three levels of user assistance.

DETAILED DESCRIPTION

One embodiment is an embedded user assistance system that provides multiple levels of help from a user interface, including embedded user assistance and external help, and allows all levels of help to be based on a single identifier/topic id.

Figure 1:
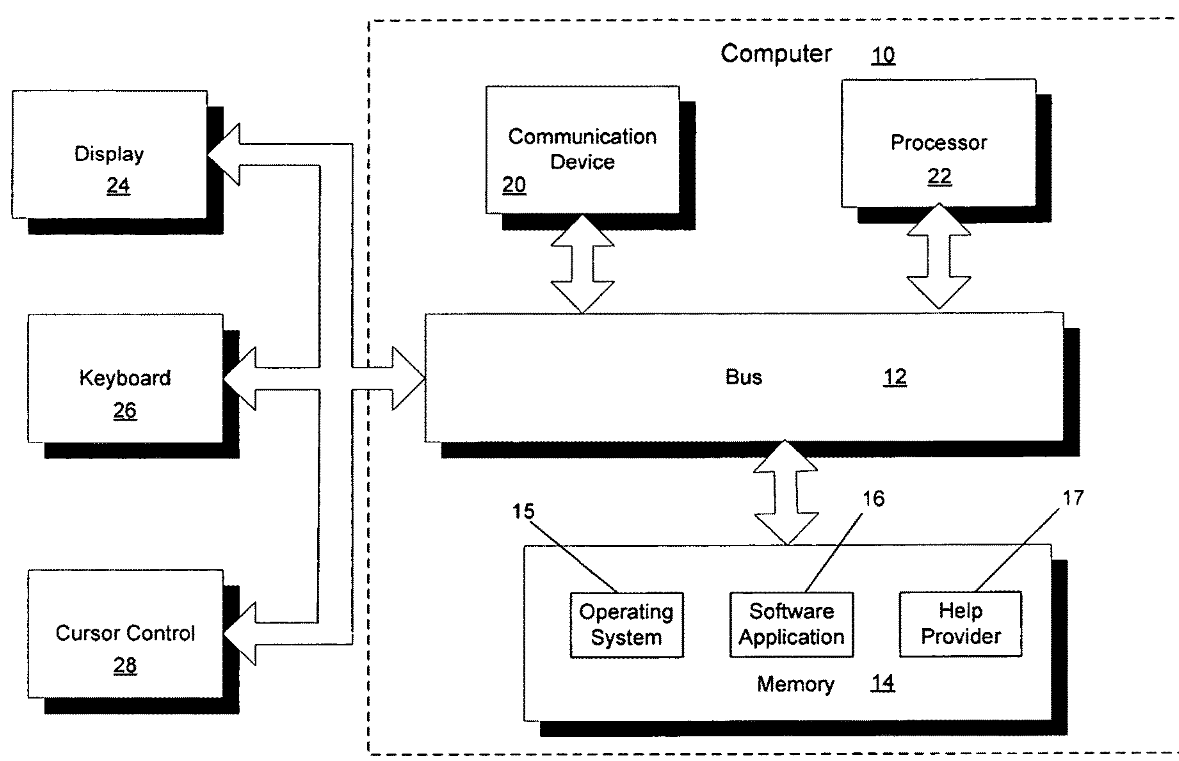
FIG. 1 is a block diagram of a computer that can implement an embodiment of the present invention.

FIG. 1 is a block diagram of a computer 10 that can implement an embodiment of the present invention. Computer 10 includes a bus 12 or other communication mechanism for communicating information, and a processor 22 coupled to bus 12 for processing information. Processor 22 may be any type of general or specific purpose processor. Computer 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. Computer 10 further includes a communication device 20, such as network interface card, to provide access to a network.

Computer 10 is further coupled via bus 12 to a display 24, such as a Liquid Crystal Display ("LCD"), for displaying information to a user. A keyboard 26 and a cursor control device 28, such as a computer mouse, is further coupled to bus 12 to enable a user to interface with computer 10.

In one embodiment, memory 14 stores an operating system 15 and a native software application 16 such as a word processing or spreadsheet application. Memory 14 further stores a Help provider module 17 that, when executed by processor 22, performs the functionality disclosed below. In another embodiment, communication device 20 is coupled to the Internet and computer 10 executes an Internet browser, such as the Internet Explorer from Microsoft Corp., and executes a web-based software application via the browser and via an Internet web server that transmits and receives data over the Internet.

In one embodiment, each component (e.g., a data picker, a header, a username and password entry box, a text input box, etc.) on a user interface for a software application includes three levels of help content that are triggered based on a certain user gesture. The three levels are: (1) concise help; (2) expanded help; and (3) full help. In one embodiment, each of these levels can comprise any arbitrary HTML content or other type of content. In one embodiment, concise and expanded help content are embedded help content, and full help is an external help system.

Figure 2:
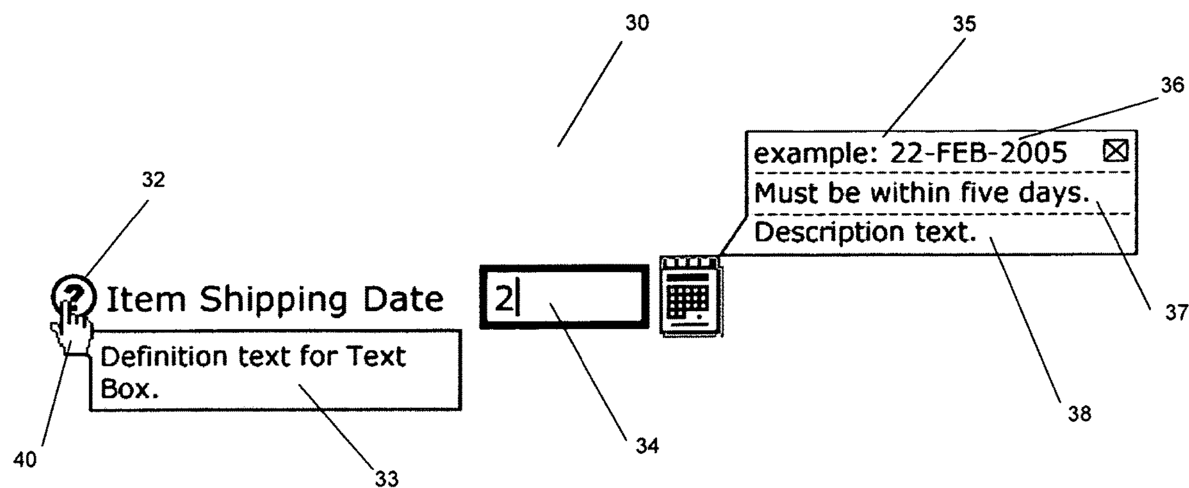
FIG. 2 is a block diagram of a component of a user interface for a software application in accordance with one embodiment.

FIG. 2 is a block diagram of a component 30 of a user interface for a software application in accordance with one embodiment. Component 30 provides the function of allowing the user to pick a date. In one embodiment, component 30 and other components are JavaServer Faces ("JSF") components, and are part of a JSF library. JSF, from Sun Microsystems, Inc., is a Java-based web application framework that simplifies the development of user interfaces for Java Platform, Enterprise Edition applications. JSF uses a component-based approach in which the state of user interface components is saved when the client requests a new page and then is restored when the request is returned. JSF components can also work with native applications. Other embodiments can be implemented with other user interface applications that include components, such as web-based frameworks (e.g., Microsoft ASP.NET, WebObjects, Apache Tapestry, Struts, etc.) or desktop frameworks (e.g., Microsoft Foundation Classes ("MFC") or Java Swing)

Component 30 includes a Help icon 32 and a text entry box 34. A user controls cursor 40. When the user hovers cursor 40 over Help icon 32, without clicking Help icon 32, concise help 33 is automatically displayed after a predetermined time period. In one embodiment, concise help 33 is a graphical user interface "tooltip" that includes text which gives a definition of text entry box 34. If the user clicks or otherwise selects Help icon 32, an embedded Uniform Resource Locator ("URL") or other type of link generates and displays a full help window (not shown) from an external help system. In one embodiment, the full help window is a separate window that allows for searchable text and other traditional help window features. In addition, an expanded help 35 is displayed as a help text window when the user hovers or gives focus to text entry box 34. In one embodiment, help text window 35 is a tooltip and includes a hints section 36, an instructions section 37 and a description section 38.

The embodiment of FIG. 2 alleviates the screen real estate problem by having concise help 33 display only when the user hovers (e.g., placing the cursor over an item without clicking/selecting the item) over help icon 32, and having expanded help 35 display only when the user has hovered or given focus (e.g., clicking on a component that can receive input) to the input control (i.e., text box 34). The component may be any type of component that receives user input, including a text box, check box, radio button, color picker, spin box, list box, choice list, etc. The third level of help, full help, requires a click or other action from the user.

With prior art embedded user assistance implementations, the help documentation author typically writes the embedded content and then for each help string the help documentation author wants to display in the user interface, the software developer has to add code to the user interface in order to display that string in the desired location. However, because software developers and help documentation authors typically work on different schedules, this tight coupling causes many problems because each iteration of work from the help documentation author requires some additional work from the software developer.

In contrast, embodiments of the present invention generally require only a single interaction between the software developer and the help documentation author. The single interaction is to establish a topic id or other type of identifier for each component of the user interface. In one embodiment, help provider 17 provides the multiple levels of help (i.e., concise, expanded and full) for the single topic id.

Figure 3:
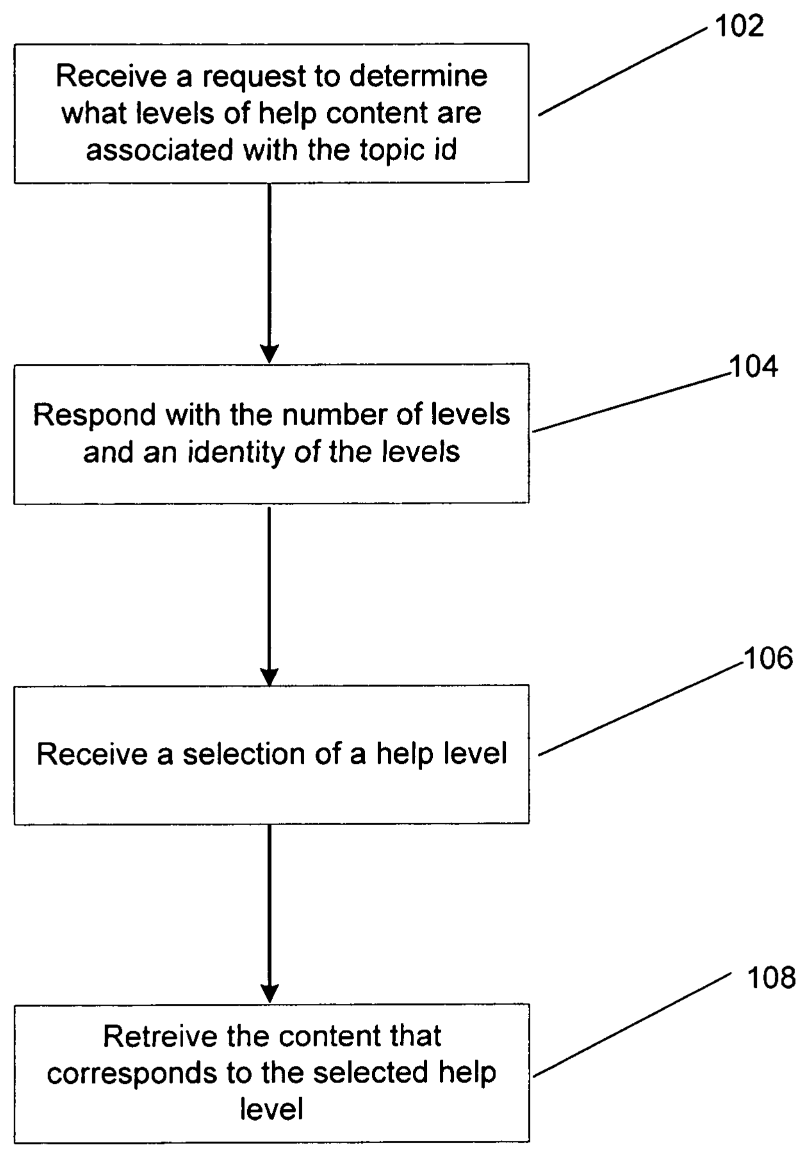
FIG. 3 is a flow diagram of the functionality the computer and a help provider in accordance with one embodiment when a user interface component is rendered and when a help level is chosen by a user.

FIG. 3 is a flow diagram of the functionality of computer 10 and help provider 17 in accordance with one embodiment when a user interface component is rendered and when a help level is chosen by a user. In one embodiment, the functionality of the flow diagram of FIG. 3 is implemented by software stored in memory or other computer readable or tangible medium, and executed by a processor. In other embodiments, the functionality can be performed by hardware, or any combination of hardware and software.

In one embodiment, the user interface component, such as component 30 of FIG. 2, is part of a native application. In that embodiment, help provider 17 and the related help files that include the help documentation are located on computer 10. In other embodiments, the user interface component is part of a web-based application and help provider 17 and the related help files are located on a web server computer and accessed by computer 10 via the Internet or other network. In one embodiment, each user interface component is part of a JSF component library and includes a help topic id attribute that allows the software developer to assign a topic id to that component. In one embodiment, the help topic id coded as follows:

<af:inputText helpTopicId="myHelpTopicId"/>.

At 102, when the user interface component is rendered on display 24, help provider 17 receives a request to determine what levels of help content are associated with the topic id, if any.

At 104, help provider 17 responds with the number of levels and an identity of the levels. In one embodiment, any combination of the three levels of help (i.e., concise, expanded and full) may correspond to a given topic id. Based on the response at 104, the user interface component renders itself appropriately to display the help levels, such as the embodiment shown in FIG. 2. The user interface component is automatically rendered without any required interaction of the user in one embodiment. Any other rendering that allows multiple help levels to be selected by a user may be used in other embodiments.

At 106, after the component has been rendered, a user selects one of the help levels by, for example, hovering the cursor over help icon 32, clicking help icon 32, or focusing on input box 34. Help provider 17 receives this selection.

At 108, in response to the request at 106, help provider 17 retrieves the content that corresponds to the selected help level from the source that stores the help documentation content. The component then displays the help content in a predetermined fashion, such as shown in FIG. 2.

As disclosed above, in one embodiment the software developer merely has to put a help topic id on the component. Because that topic id is used at runtime to dynamically fetch the multiple levels of help content from help provider 17, and because the components have built-in knowledge of how to display those three levels of content, the help documentation author can separate the decision of what levels of help content are appropriate for each component (e.g., 3 levels, 1 level, etc.) and then write this content in their external system without having to request any changes from the developer or touch the developer's original user interface code in any way.

Most known help authoring tools produce HTML pages and a map file that maps topic ids to full HTML pages. Examples of such tools include Adobe RoboHelp, Microsoft HTML Help Workshop, and Madcap Flare. However, these known tools typically have only one piece of help information associated with the topic id, such as an external help window. In contrast, embodiments of the present invention have multiple levels of help information associated with a single topic id. In one embodiment, a special syntax is inserted inside of a help topic HTML page to demarcate sections of the page as concise help text or expanded help text. The remainder of the page continues to be the regular HTML that is displayed when the full external URL is displayed in the help system. Because of the exact syntax used, the concise help text or expanded help text embedded in the page is not visible to the end user when they view the full page in the external help system.

In one embodiment, concise help and expanded help content for a topic are to be specified using standard HTML in an HTML file. Concise help can be specified within a <div> with hard coded style class name of “conciseHelp”. The title attribute specifies the topic id of the concise help using the following format:

```
<div title="topic-id" class="conciseHelp">
Definition text for Text Box.
</div>
```

Expanded help may specified within a <div> with hard coded style class name of “expandedHelp”. The title attribute specifies the topic id of the expanded help using the following format:

```
<div title="topic-id" class="expandedHelp">
Must be within five days.
</div>
```

In one embodiment, concise help and expanded help content for a topic can be created as HTML files in one of 2 ways:

1. In a current topic HTML file, together with the full content for the specific help topic (dedicated content); or 2. In a separate HTML file, together with the concise and expanded help content of other help topics (aggregated content).

The <div> tags appear within the HTML body. In one embodiment, the concise help and expanded help content are specified in the same file. If either of them is not available in the same file, the content is assumed to be undefined.

In one embodiment, dedicated content is used to allow a Help documentation author to specify concise and expanded help content for a topic id in an existing topic HTML file. This approach is useful when there is full help content available for the embedded help content, or the embedded help content is reusable across many user interface screens, with or without the full help content. The following is an example of dedicated content HTML coding:

```
<html>
<body>
<div title="topic1" class="conciseHelp">
This is <b>concise</b> help content.
</div>
...
<div title="topic1" class="expandedHelp">
This is <b>expanded</b> help content.
</div>
...
This is the regular full content.
...
</body>
</html>
```

In one embodiment, the title attribute is optional. If not given, the topic id is the topic id of the HTML file. If given, it should match the topic id of the HTML file. The <div> can appear anywhere within the <body>. The conciseHelp and expandedHelp style classes can be defined in the existing style sheet. In one embodiment, the two style classes may be defined in such a way that they provide the necessary visual cues to distinguish them from the full help content. For example, help documentation authors can use a light yellow background with a gray border to indicate concise help and a light blue background with a blue border to indicate expanded help. This is useful for content creation and editing. Further, the two style classes may be defined to be invisible (i.e., display:none) when help documentation authors need to view the full help content only. This is useful for previewing the full help content.

In one embodiment, aggregated content is used to enable a help author to consolidate concise and expanded content for multiple topics in a single file. One benefit for aggregating content is to be able to specify all concise content for a single screen in a single file, or aggregate reusable embedded help content in a single file. In addition, it allows embedded help content to be packaged, deployed and upgraded separately from typical full help content such as context sensitive help. The following is an example of aggregated content HTML coding:

```
<html>
<body>
<div title="topic1" class="conciseHelp">
Concise help html content for topic1
</div>
<div title="topic1" class="expandedHelp">
Expanded help html content for topic1
</div>
<div title="topic2 class="conciseHelp">
Concise help html content for topic2
</div>
<div title="topic2 class="expandedHelp">
Expanded help html content for topic2
</div>
...
<div title="topic9" class="conciseHelp">
Concise help html content for topic9
</div>
<div title="topic9" class="expandedHelp">
Expanded help html content for topic9
</div>
...
</body>
</html>
```

In one embodiment, the title attribute is required, the order of <div>s is not significant, and only concise and expanded help content is allowed and they must appear in a <div>. In one embodiment, if a help topic has all three levels of help, help authors can define all levels of content in a dedicated file, or define the embedded help content in an aggregated file, and the full help content in a separate file. Further, a file containing aggregated content should be configured to be excluded from indexing. Further, the concise help and expanded help style classes can be defined in the existing style sheet to give visual cues.

In one embodiment, in order to provide configuration and runtime support for the aggregated content, the topicId attribute for a user interface component that has embedded help content which is aggregated with other embedded help content in a single file has the following format:

TopicId1#TopicId2 where “TopicId1” is the topic id that represents the file with aggregated content and “TopicId2” is the topic id that represents the embedded help content associated with the specific user interface component; and # is a required literal delimiter.

The following is an example of configuration and run support for aggregated content of a screen that includes 9 input text fields with embedded help content (screen1.jspx):

```
<af:inputText value="#{binding.to.field1}"
      topicId="screen1#topic1"/>
<af:inputText value="#{binding.to.field2}"
     topicId="screen1#topic2"/>
...
<af:inputText value="#{binding.to.field9}"
     topicId="screen1#topic9"/>
```

(map.xml):

```
<?xml version='1.0' ?>
<map>
  <mapID target="screen1" url="screen1.html" />
  ...
</map>
```

As shown, no entry is needed in the map file for topic1 to topic 9. However, it is possible that map entries may exist for these topics, in which case the mapped URLs represent their full help content.

In one embodiment, the following logic may be used at runtime to retrieve the embedded help content for a given topic id and locale id. Post processing may be applied to the returned content to resolve all links.

1. Find and load the helpset for the topic id and locale id.
2. If the topic id does not contain the # delimiter, it is assumed that the embedded help content is stored in its dedicated file, look up the topic id in the topic map
   - if topic id is found, load the html file and look up the <div> that has its class attribute set to conciseHelp
     - if found, return the content inside the <div>
     - if not found, return null
   - if topic id is not found, return null.
3. If the topic id contains the # delimiter, split the topic id into topicId1 and topicId2, look up the topicId1 in the map to locate the html file that carries the content
   - if topicId1 is found, load the html file and look up the <div> that has its title attribute set to the topicId2 and class attribute set to conciseHelp
     - if found, return the content inside the <div>
     - if not found, return null
   - if topicId1 is not found, return null.

In all cases, if the HTML file cannot be located or loaded, return null.

In one embodiment, the following logic may be used at runtime to retrieve the full help content for a given topic id and locale id. Post processing may be applied to the returned content to remove any embedded help content as well as resolve all links.

1. Find and load the helpset for the topic id and locale id.
2. If the topic id does not contain the # delimiter, look up the topic id in the topic map
   - if topic id is found, load the html file and return its content
   - if topic id is not found, return null
3. If the topic id contains the # delimiter, split the topic id into topicId1 and topicId2, look up the topicId2 in the map to locate the html file that carries the content
   - if topicId2 is found, load the html file and return its content
   - if topicId2 is not found, return null In all cases, if the HTML file cannot be located or loaded, return null.

As disclosed, embodiments of the present invention generate user interface components that have multiple levels of help. All levels of help are linked to a single identifier or topic ID. Further, the levels of help may be selected in such a manner that screen real estate is reduced.

Several embodiments are specifically illustrated and/or described herein. However, it will be appreciated that modifications and variations of are covered by the above teachings and within the purview of the appended claims without departing from the spirit and intended scope of the invention.

What is claimed is:

1. A method of providing user assistance by generating a component that is rendered as part of a rendering of a user interface and that comprises multiple levels of user assistance, the method comprising:

receiving, at a web server, a first request from a web browser on a client computer to render the user interface on the web browser that comprises the component, wherein code corresponding to the component comprises a help identifier that is received with the first request;

in response to the first request and based on the help identifier, remotely providing from a web server before the component is rendered how many levels of user assistance correspond to the component and an identity of the levels;

wherein in response to receiving a number of levels and the identity of the levels, the component is subsequently automatically rendered in connection with rendering the user interface on the web browser to allow the number of levels to be selected by a user, wherein a help functionality of the component is based on the number of levels and the identity of the levels, and the component is rendered and displayed before any user interaction with the user interface to correspond to the number of levels when the user interface is initially displayed;

wherein the component has a built-in knowledge within the component itself of the number of levels of user assistance, the built-in knowledge is implemented when the component is initially rendered and before any user interaction with the user interface, and the number of levels of user assistance is varied depending on the number of levels of user assistance received from the web server in response to the help identifier before the component is rendered, the built-in knowledge enabling each of the different levels of user assistance to be generated in response to different types of user interactions with the component;

wherein the component comprises a plurality of different display elements, each different display element corresponding to each of the levels, and the built-in knowledge of the component determines which of the different display elements is displayed in response to the user interaction with the user interface based on the number of levels;

after the component is rendered, receiving a second request for user assistance from the user interacting with the component on the user interface, wherein the second request comprises a type of user interaction among the different types of user interactions that determines a level of user assistance; and retrieving a user assistance content based on the level of user assistance.

2. The method of claim 1, wherein a first display element comprises a help icon, and the type of user interaction comprises hovering a cursor over the help icon for a predetermined time period which causes a display of concise help information.

3. The method of claim 2, wherein the type of user interaction comprises selecting the help icon with the cursor which causes a display of a full help window from an external help system.

4. The method of claim 2, wherein the component is adapted for user input.

5. The method of claim 4, wherein a second display element is a text entry box, and the type of user interaction comprises focusing the cursor on the text entry box which causes a display of a help text window comprising a tooltip.

6. The method of claim 1, wherein the component comprises a JavaServer Faces component.

7. The method of claim 1, wherein the user assistance content comprises embedded content.

8. The method of claim 7, wherein the embedded content comprises at least two levels of embedded content.

9. The method of claim 1, wherein the user assistance content comprises an external help system.

10. The method of claim 1, wherein the user assistance content comprises a Hypertext Markup Language (HTML) file that comprises an HTML page and comprises one or more of the levels of help assistance embedded in the HTML page so that the embedded help assistance is not visible to the user when the page is viewed.

11. A system for providing user assistance comprising:

a processor;

a help provider coupled to the processor, wherein the help provider receives, at a web server, a first request from a web browser on a client computer to render a user interface on the web browser that comprises a component that is rendered as part of a rendering of a user interface, wherein code corresponding to the component comprises a help identifier;

in response to the first request and based on the help identifier, the help provider remotely provides from a web server before the component is rendered how many levels of user assistance correspond to the component and an identity of the levels;

wherein in response to receiving a number of levels and the identity of the levels, the component is subsequently automatically rendered in connection with rendering the user interface on the web browser to allow the number of levels to be selected by a user, wherein a help functionality of the component is based on the number of levels and the identity of the levels, and the component is rendered and displayed before any user interaction with the user interface to correspond to the number of levels when the user interface is initially displayed;

wherein the component has a built-in knowledge within the component itself of the number of levels of user assistance, the built-in knowledge is implemented when the component is initially rendered and before any user interaction with the user interface, and the number of levels of user assistance is varied depending on the number of levels of user assistance received from the web server in response to the help identifier before the component is rendered, the built-in knowledge enabling each of the different levels of user assistance to be generated in response to different types of user interactions with the component;

wherein the component comprises a plurality of different display elements, each different display element corresponding to each of the levels, and the built-in knowledge of the component determines which of the different display elements is displayed in response to the user interaction with the user interface based on the number of levels;

after the component is rendered, receiving a second request for user assistance from the user interacting with the component on the user interface, wherein the second request comprises a type of user interaction among the different types of user interactions that determines a level of user assistance; and retrieving a user assistance content based on the level of user assistance.

12. The system of claim 11, wherein the component comprises a JavaServer Faces component.

13. The system of claim 11, wherein the user assistance content comprises a Hypertext Markup Language (HTML) file that comprises an HTML page and comprises one or more of the levels of help assistance embedded in the HTML page so that the embedded help assistance is not visible to the user when the page is viewed.

14. A non-transitory computer readable medium having instructions stored thereon that, when executed by a processor, cause the processor to generate a component that is rendered as part of a rendering of a user interface and that comprises multiple levels of user assistance, the generating comprising:

receiving, at a web server, a first request from a web browser on a client computer to render the user interface on the web browser that comprises the component, wherein code corresponding to the component comprises a help identifier that is received with the first request;

in response to the first request and based on the help identifier, remotely providing from a web server before the component is rendered how many levels of user assistance correspond to the component and an identity of the levels;

wherein in response to receiving a number of levels and the identity of the levels, the component is subsequently automatically rendered in connection with rendering the user interface on the web browser to allow the number of levels to be selected by a user, wherein a help functionality of the component is based on the number of levels and the identity of the levels, and the component is rendered and displayed before any user interaction with the user interface to correspond to the number of levels when the user interface is initially displayed;

wherein the component has a built-in knowledge within the component itself of the number of levels of user assistance, the built-in knowledge is implemented when the component is initially rendered and before any user interaction with the user interface, and the number of levels of user assistance is varied depending on the number of levels of user assistance received from the web server in response to the help identifier before the component is rendered, the built-in knowledge enabling each of the different levels of user assistance to be generated in response to different types of user interactions with the component;

wherein the component comprises a plurality of different display elements, each different display element corresponding to each of the levels, and the built-in knowledge of the component determines which of the different display elements is displayed in response to the user interaction with the user interface based on the number of levels;

after the component is rendered, receiving a second request for user assistance from the user interacting with the component on the user interface, wherein the second request comprises a type of user interaction among the different types of user interactions that determines a level of user assistance; and retrieving a user assistance content based on the level of user assistance.

15. The computer readable medium of claim 14, wherein the component comprises a JavaServer Faces component.

16. The computer readable medium of claim 14, wherein the user assistance content comprises a Hypertext Markup Language (HTML) file that comprises an HTML page and comprises one or more of the levels of help assistance embedded in the HTML page so that the embedded help assistance is not visible to the user when the page is viewed.

17. The computer readable medium of claim 14, wherein a first display element comprises a help icon, and the type of user interaction comprises hovering a cursor over the help icon for a predetermined time period which causes a display of concise help information.

18. The computer readable medium of claim 17, wherein the type of user interaction comprises selecting the help icon with the cursor which causes a display of a full help window from an external help system.

19. A system for providing user assistance comprising:

means for receiving, at a web server, a first request from a web browser on a client computer to render a user interface on the web browser that comprises a component that is rendered as part of a rendering of a user interface and, wherein code corresponding to the component comprises a help identifier;

in response to the first request and based on the help identifier that is received with the first request, means for remotely providing from a web server before the component is rendered how many levels of user assistance correspond to the component and an identity of the levels;

wherein in response to receiving a number of levels and the identity of the levels, the component is subsequently automatically rendered in connection with rendering the user interface on the web browser to allow the number of levels to be selected by a user, wherein a help functionality of the component is based on the number of levels and the identity of the levels, and the component is rendered and displayed before any user interaction with the user interface to correspond to the number of levels when the user interface is initially displayed;

wherein the component has a built-in knowledge within the component itself of the number of levels of user assistance, the built-in knowledge is implemented when the component is initially rendered and before any user interaction with the user interface, and the number of levels of user assistance is varied depending on the number of levels of user assistance received from the web server in response to the help identifier before the component is rendered, the built-in knowledge enabling each of the different levels of user assistance to be generated in response to different types of user interactions with the component;

wherein the component comprises a plurality of different display elements, each different display element corresponding to each of the levels, and the built-in knowledge of the component determines which of the different display elements is displayed in response to the user interaction with the user interface based on the number of levels;

after the component is rendered, receiving a second request for user assistance from the user interacting with the component on the user interface, wherein the second request comprises a type of user interaction among the different types of user interactions that determines a level of user assistance; and means for retrieving a user assistance content based on the level of user assistance.

20. The system of claim 19, wherein the component comprises a JavaServer Faces component.

* * * * *